(12) United States Patent
Edwards

(10) Patent No.: US 11,511,888 B2
(45) Date of Patent: Nov. 29, 2022

(54) TOOL FOR LOCATING A SEAL MEMBER ON A RIB OF AN AIRCRAFT

(71) Applicant: AIRBUS OPERATIONS LIMITED, Bristol (GB)

(72) Inventor: Paul Edwards, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 572 days.

(21) Appl. No.: 16/184,057

(22) Filed: Nov. 8, 2018

(65) Prior Publication Data

US 2019/0135455 A1    May 9, 2019

(30) Foreign Application Priority Data

Nov. 8, 2017    (GB) .................................... 1718477

(51) Int. Cl.
*B64F 5/50*     (2017.01)
*B64C 3/18*     (2006.01)
*B64F 5/10*     (2017.01)
*B29C 59/02*    (2006.01)

(52) U.S. Cl.
CPC .............. *B64F 5/50* (2017.01); *B64C 3/182* (2013.01); *B64C 3/187* (2013.01); *B64F 5/10* (2017.01); *B29C 59/022* (2013.01)

(58) Field of Classification Search
CPC ..................................... B64F 5/50; B64F 5/10
See application file for complete search history.

(56) References Cited

U.S. PATENT DOCUMENTS

2012/0325968 A1    12/2012  Oyzerskiy
2016/0355273 A1    12/2016  Perez Diaz et al.
2017/0210482 A1     7/2017  Morgan

OTHER PUBLICATIONS

Combined Search and Examination Report for GB 1718477,1 dated Apr. 20, 2018, 5 pages.
European Search Report for EP Application No. 20158148.5, seven pages, dated May 4, 2020.

*Primary Examiner* — Jessica B Wong
(74) *Attorney, Agent, or Firm* — Nixon & Vanderhye P.C.

(57) ABSTRACT

Seal member arrangements having at least one seal plate are disposed over stringer receiving recesses in ribs of an aircraft. A tool for locating a seal member arrangement over a stringer-receiving recess in a rib of an aircraft assembly. The tool system has a holder configured to hold the seal member arrangement over the recess. A biasing arrangement is configured to act on the holder to bias the seal member arrangement into an aligned position with a stringer received in the recess. A fixing arrangement is configured to act on the seal member arrangement to fix the seal member arrangement in the aligned position. A sealing kit, an aircraft assembly, a method of fixing a seal member arrangement over a stringer-receiving recess in a rib of an aircraft are also disclosed.

19 Claims, 8 Drawing Sheets

TOOL FOR LOCATING A SEAL MEMBER ON A RIB OF AN AIRCRAFT

CROSS RELATED APPLICATION

This application claims priority to United Kingdom (GB) patent application 1718477.1, filed Nov. 8, 2017, the entire contents of which is hereby incorporated by reference.

FIELD OF THE INVENTION

The present invention relates to a tool for locating a seal member arrangement over a stringer-receiving recess in a rib of an aircraft assembly. The present invention also relates to a sealing kit, an aircraft assembly, a method of fixing a seal member arrangement over a stringer-receiving recess in a rib of an aircraft, and an aircraft.

BACKGROUND OF THE INVENTION

Aircraft wings are typically formed with a wing assembly comprising a pair of spars which extend in a spanwise direction, that is from a root of a wing at the fuselage of the aircraft to a wing tip distal from the root. A plurality of ribs extend in a chordwise direction, that is in a direction from a leading edge of the wing to a trailing edge. The ribs extend between the spars. A skin comprising lower and upper covers extends over the lower and upper sides of the spars and ribs.

Fuel in an aircraft is typically stored in one or more fuel tanks or sealed compartments located in the interior space of the wings and fuselage of the aircraft. The fuel tanks or sealed compartments are typically defined by structural components of the aircraft assembly. The boundary of such a fuel tank or sealed compartment may be at least partially defined by the spanwise extending spars, a pair of sealed ribs and the lower and upper covers.

A plurality of stringers are disposed on an inner surface of the skin and act to stiffen the skin. The stringers extend in a spanwise direction. As such, the stringers extend through the plurality of ribs. Cut-outs, acting as recesses are formed at the edges of the sealed ribs through which the stringers extend. The cut-outs are provided with dimensions greater than those of the stringer to be received to account for tolerance build-up during manufacture and assembly of components.

Seal plates are provided to seal the cut-outs formed in the rib. Each seal plate is typically fastened to the rib and extends over the cut-out to lie adjacent to the stringer extending therethrough. A bead of sealant provides a liquid tight joint between the sealing plate and the stringer to restrict the flow of fuel through the cut-out. Each cut-out is sealed by a pair of seal plates, one on each side of the stringer. The pair of seal plates overlap each other at the upper end of the cut-out.

Seal plates are manually installed from inside the fuel tank following assembly of the cover with the ribs. Seal plates are required to cover and seal the cut-outs. With such an approach it is possible to select an appropriately sized seal plate and install the seal plate over the cut-out.

However, installation of the seal plates in an assembled fuel tank is difficult and time consuming due to the confined space available. It is also necessary to measure the gap formed by the cut-out and select and fit an appropriate seal plate.

SUMMARY OF THE INVENTION

According to an aspect of the invention, there is provided a tool for locating a seal member arrangement over a stringer-receiving recess in a rib of an aircraft assembly, the tool comprising a holder configured to hold the seal member arrangement over the recess, a biasing arrangement configured to act on the holder to bias the seal member arrangement into an aligned position with a stringer received in the recess, and a fixing arrangement configured to act on the seal member arrangement to fix the seal member arrangement in the aligned position.

With this arrangement, it is possible for the tool to self-align the seal member arrangement with a stringer. As such it is possible to simplify assembly of the aircraft assembly, and so reduce assembly time.

The tool may comprise a mount configured to mount the seal member arrangement to the rib.

The holder may be configured to align an abutment edge of the seal member arrangement with an adjacent surface of the stringer received in the recess in the aligned position.

The holder may comprise an aligning edge configured to abut against the stringer to align the seal member arrangement in the aligned position. As such, alignment of the seal member arrangement is simplified. It is possible to improve the sealing of the seal member arrangement over the recess.

The holder may be configured to hold the seal member so that the abutment edge of the seal member is configured to abut against the stringer to locate at least part of the seal member arrangement in the aligned position.

The seal member arrangement may comprise a seal plate, and the holder may be configured to receive the seal plate.

The biasing arrangement may be configured to bias the seal plate in a direction along the plane of the seal plate.

The holder may be configured to hold the seal plate parallel to a face of the rib in which the recess is formed.

The holder may comprise a retention element for retaining the seal plate on the holder. As such, retention of the seal plate by the tool is simplified.

The retention element may comprise a cavity configured to at least partially receive the seal plate.

The retention element may comprise a suction pad.

The seal plate may be a first seal plate, and the holder may comprise a first holder part configured to hold the first seal plate. The tool may comprise a second holder part configured to hold a second seal plate, wherein the biasing arrangement is configured to bias the first holder part and the second holder part in different directions.

The biasing arrangement may be configured to bias the first holder part and the second holder part in opposing directions.

The first and second holder parts may be movable between a neutral position in which a spacing between the first and second seal plates held by the first and second holder parts is less than a thickness of a web of the stringer configured to be received between the holders, and the aligned position in which the spacing between the first and second seal plates held by the first and second holder parts corresponds to the thickness of the web of the stringer.

The tool may further comprise a third holder part configured to hold a third seal plate wherein the biasing arrangement is configured to bias the third holder part in different directions to the first holder part and the second holder part.

The biasing arrangement may be configured to allow the seal member to pivot.

The tool may further comprise a position marking arrangement for marking the alignment of the seal member arrangement relative to the rib.

The position marking arrangement may comprise a templating arrangement on the holder for templating at least one seal member arrangement fastening hole in the seal member arrangement and/or the rib.

The templating arrangement may comprise at least one template hole extending through the holder.

The biasing arrangement may be configured to act on the holder to bias the seal member arrangement.

The biasing arrangement may comprise at least one resilient member.

The fixing arrangement may be configured to urge the seal member arrangement against the rib when the seal member arrangement is located over the recess.

The fixing arrangement may be configured to act on the seal member arrangement in a direction perpendicular to the biasing arrangement.

The holder may be configured to expose a rib-locating side of the seal member arrangement when the seal member arrangement is received by the holder.

The holder may be configured to hold the seal member arrangement against the rib when the seal member arrangement is located over the recess.

The fixing arrangement may comprise an actuator configured to selectably move between fixed and movable conditions.

The actuator may be configured to be wirelessly operable.

The mount may comprise a rib stiffening assembly tool.

The holder may comprise a cam surface configured to act on the stiffener inserted into the recess.

According to an aspect of the invention, there is provided a sealing kit for sealing a stringer-receiving recess in a rib of an aircraft assembly, comprising the tool as set out above and at least one seal member.

The sealing kit may comprise a curable sealant.

According to an aspect of the invention, there is provided an aircraft assembly comprising a rib having at least two rib feet configured to join a bottom edge of the rib to another component and a recess between the rib feet; a stringer received in and extending through the recess; a first seal plate extending at least partially over the recess from a first edge of the recess; a second seal plate extending at least partially over the recess from a second edge of the recess; and a third seal plate extending at least partially over the recess from a third edge of the recess.

The first, second and third seal plates may not overlap.

According to an aspect of the invention, there is provided a method of fixing a seal member arrangement over a stringer-receiving recess in a rib of an aircraft, the method comprising positioning a tool holding a seal member arrangement at least partially over the recess, biasing the seal member arrangement into an aligned position with a stringer received in the recess, fixing the seal member arrangement in the aligned position; removing the stringer from the recess; and fastening the seal member arrangement to the rib in the aligned position.

The method may comprise marking the location of the seal member arrangement on the rib in the aligned position, and removing the tool prior to fastening the seal member arrangement in the aligned position.

The method may comprise using a templating arrangement of the tool to form fastening holes through the rib and/or seal member arrangement to mark the location of the seal member arrangement on the rib in the aligned position.

The method may comprise urging the seal member arrangement against the rib to fix the seal member arrangement in the aligned position.

The method may comprise, subsequent to positioning the tool, inserting the stringer in the recess such that the seal member arrangement is urged outwardly.

The method may comprise, subsequent to fastening the seal member arrangement to the rib, reinserting the stringer in the recess.

The method may comprise applying sealant to the seal member arrangement prior to reinserting the stringer in the recess.

According to an aspect of the invention, there is provided an aircraft assembly formed by the method as set out above.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
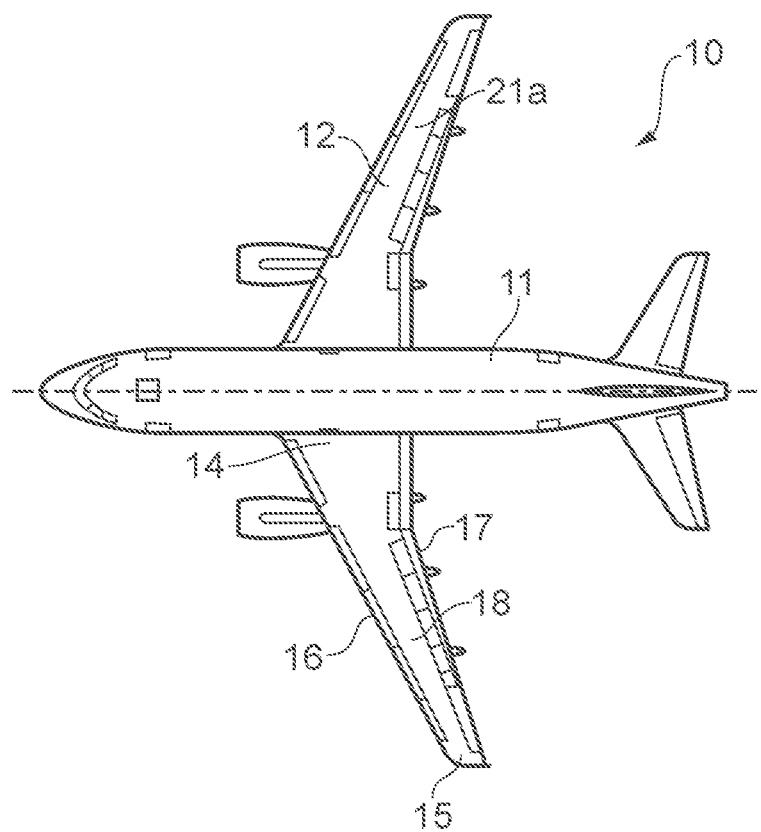
FIG. 1 is a plan view of an aircraft.

An aircraft 10 is shown in FIG. 1. The aircraft 10 includes a fuselage 11. Two wings 12 extend from the fuselage 11. It will be appreciated that the fuselage 11 and wings 12 may take a variety of different planformed shapes and profiles. Each wing 12 has a wing root 14 at the juncture with the fuselage 11. The wing 12 has a wing tip 15 at a distal end to the wing root 14. The wing 12 has a leading edge 16 and a trailing edge 17. The wing 12 comprises a wing box 18. The wing box 18 is an aircraft assembly.

One of the wings 12 will be described herein. The wing 12 has a spanwise axis which extends in a direction from the wing root 14 to the wing tip 15. The wing 12 has a chordwise axis which extends in a direction from the leading edge 16 to the trailing edge 17.

Figure 2:
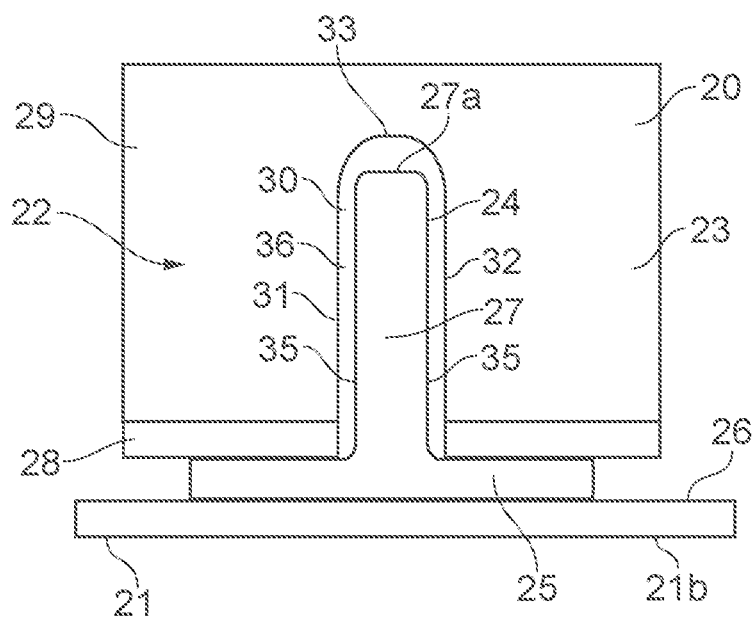
FIG. 2 is a cut-away schematic side view of part of a wing box assembly of a wing of the aircraft shown in FIG. 1 at an interface of a rib, a stringer and a lower cover.

Part of the wing box 18 is shown in FIG. 2. The wing 12 comprises a pair of spars (not shown) extending in the spanwise direction. A plurality of ribs 20 extend in the chordwise direction. The ribs 20 are substantially planar, and located at intervals along the span of the wing 12. The ribs 20 extend between the spars (not shown). Part of one rib 20 is shown in FIG. 2. The wing 12 has a skin 21 comprising an upper cover 21a and a lower cover 21b. The upper cover 21a is shown in FIG. 1 and the lower cover 21b in FIG. 2. The wing box 18 defines a number of sealed compartments or fuel tanks 22 which are separated from each other by the ribs 20.

Each sealed compartment 22 has upper and lower walls provided by the upper and lower covers 21a, 21b, fore and aft walls provided by the spars (not shown), and inboard and outboard walls provided by a pair of sealed ribs 20. The inboard and outboard walls may be defined by adjacent ribs 20. In one embodiment, intermediate unsealed ribs are provided in the fuel compartment 22. The pair of sealed ribs 20 provide boundaries between the sealed compartments 22. The sealed ribs 20 are sealed around their peripheries to prevent fuel flowing from the sealed compartment 22, across the plane of the sealed ribs 20, apart from through predetermined conduits.

FIG. 2 shows a face 23 of the rib 20 where it joins the lower cover 21b. The lower cover 21b carries a plurality of stringers 24 which run spanwise along the wing 12. One of such stringers 24 is shown in FIG. 2, and it has a T-section with a lower flange, or stringer foot, 25 attached to an inner surface 26 of the lower cover 21b and a blade, or stringer web, 27 extending away from the lower cover 21b. The stringer web 27 upstands from the stringer foot 25. The stringer web 27 has a free end 27a at the distal end to the stringer foot 25.

The plurality of stringers 24 extend spanwise along the skin 21 and act to stiffen the skin 21. The stringers 24 are fastened to the skin 21.

The rib 20 is attached to the skin 21 by a series of rib feet 28. Two rib feet 28 are shown in FIG. 2. In this case the rib feet 28 are attached to the stringer foot 25 of the stringer 24. The rib 20 has a rib web 29. The rib web 29 defines the face 23. The rib web 29 comprises a substantially planar panel. The rib feet 28 comprise a flanged section extending perpendicular to the plane of the rib web 29. Mounting holes (not shown) are formed through the rib feet 28.

The stringer 24 passes through a cut-out 30 between adjacent rib feet 28. The cut-out 30 is formed in the bottom edge of the rib 20. The cut-out 30 acts as a recess. The cut-out 30 has a first side edge 31, a second, opposing, side edge 32, and an upper edge 33. The upper edge 33 is arcuate.

The stringer web 27 has opposing side surfaces 35.

Figure 14:
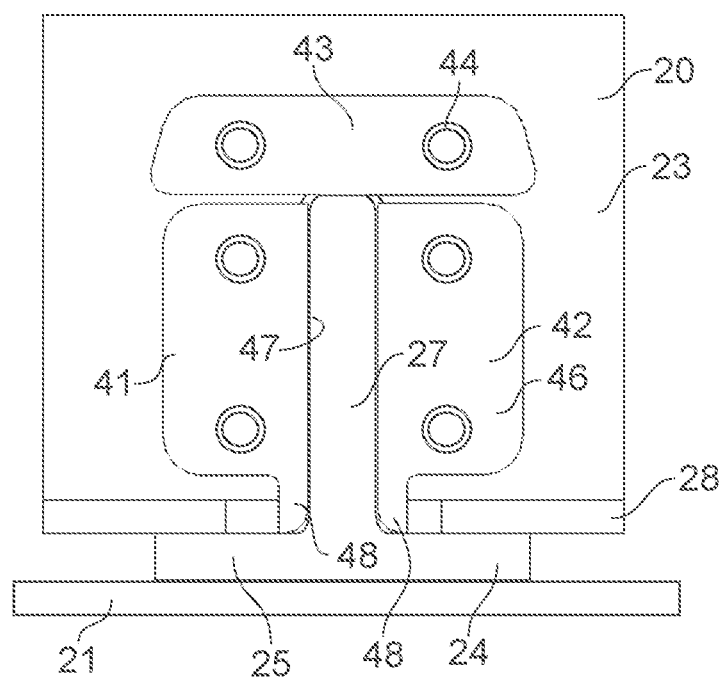
FIG. 14 is a schematic view of the assembled rib and seal plates shown in FIG. 13 with the stringer in the assembled position.

A gap 36 is formed between the stringer 24 and the edges 31, 32, 33 of the cut-out 30. The gap 36 extends around the periphery of the part of the stringer web 27 received in the cut-out 30. As shown in FIG. 14, the gap between the stringer 24 and the rib 20 is covered by a seal member arrangement 40. The seal member arrangement 40 comprises first, second and third seal plates 41, 42, 43 which are fastened to the rib 20 by fasteners 44. The seal plates 41, 42, 43 act as seal members. As such, seal members may have different configurations.

The seal member arrangement 40 prevents fuel from flowing across the rib 20 through the gap 36. Sealant (not shown) is disposed around the seal member arrangement 40. As such, the edges of the seal plates 41, 42, 43 are made fluid-tight by a bead of sealant which runs around the full periphery of each of the seal plates 41, 42, 43.

In the present arrangement, the seal member arrangement 40 comprises three seal plates—the first seal plate 41 disposed on a first side of the stiffener web 27, the second seal plate 42 disposed on the other, opposing, side of the stiffener web 27 and the third seal plate 43 disposed on the top end of the stiffener web. The number of seal plates of the seal member arrangement 40 may differ. The seal member arrangement 40 may comprise one seal plate. Alternatively, the seal member arrangement 40 may comprise two seal plates. In such an embodiment, the seal plates may be disposed on each side of the stiffener web 27, and may comprise a protruding portion which extends partially over the free end 27a. An advantage of using three seal plates is that a close fit with the stiffener web may be made irrespective of the tolerance build-up on each side and the upper end of the stiffener web 27, and so the remaining gap to be sealed by sealant may be minimised.

Each seal plate 41, 42, 43 comprises a rib locating face 45 (refer to FIG. 4) and a holding face 46. An edge of each seal plate 41, 42, 43 forms an abutment edge 47. The abutment edge 47 is configured to locate adjacent to the stringer 24. The length of the abutment edge 47 of each of the first and second seal plates 41, 42 generally corresponds to the length of the stiffener web 27. The seal plates 41, 42, 43 are formed from a rigid material, such as aluminium. Each of the first and second seal plates 41, 42 has an end protrusion 48. The end protrusion 48 defines part of the abutment edge 47. Each edge plate 41, 42, 43 is planar.

Figure 3:
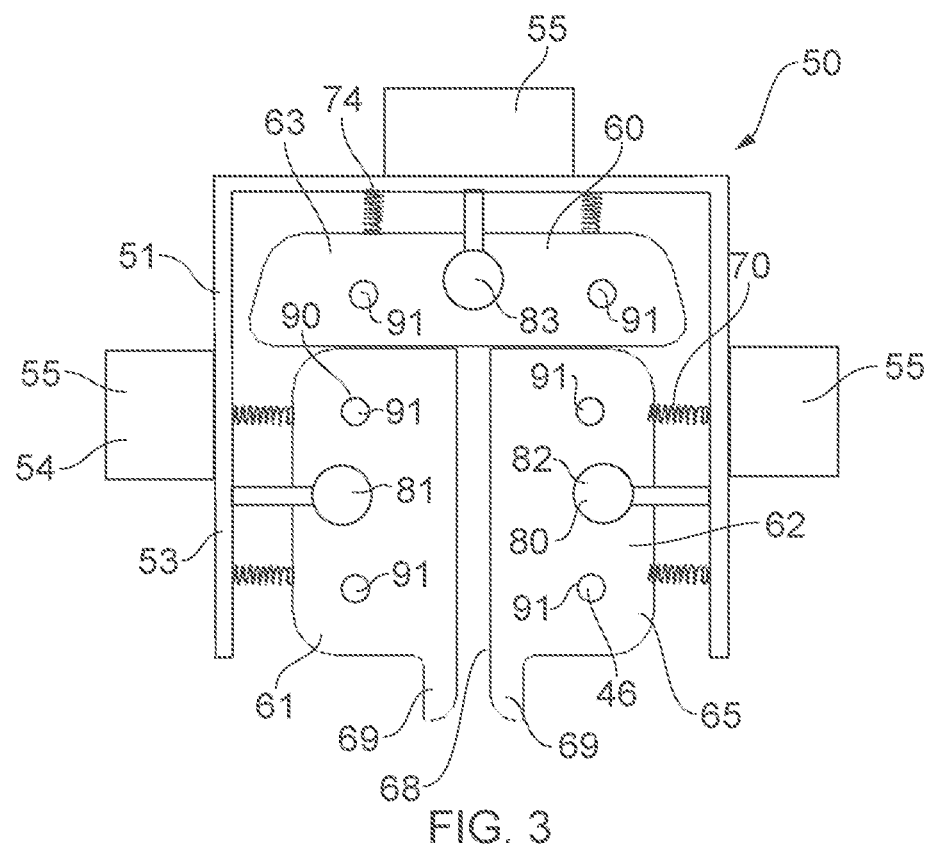
FIG. 3 is a schematic rear view of a tool configured to locate a seal plate arrangement over a stringer-receiving recess formed in the aircraft rib shown in FIG. 2.
Figure 4:
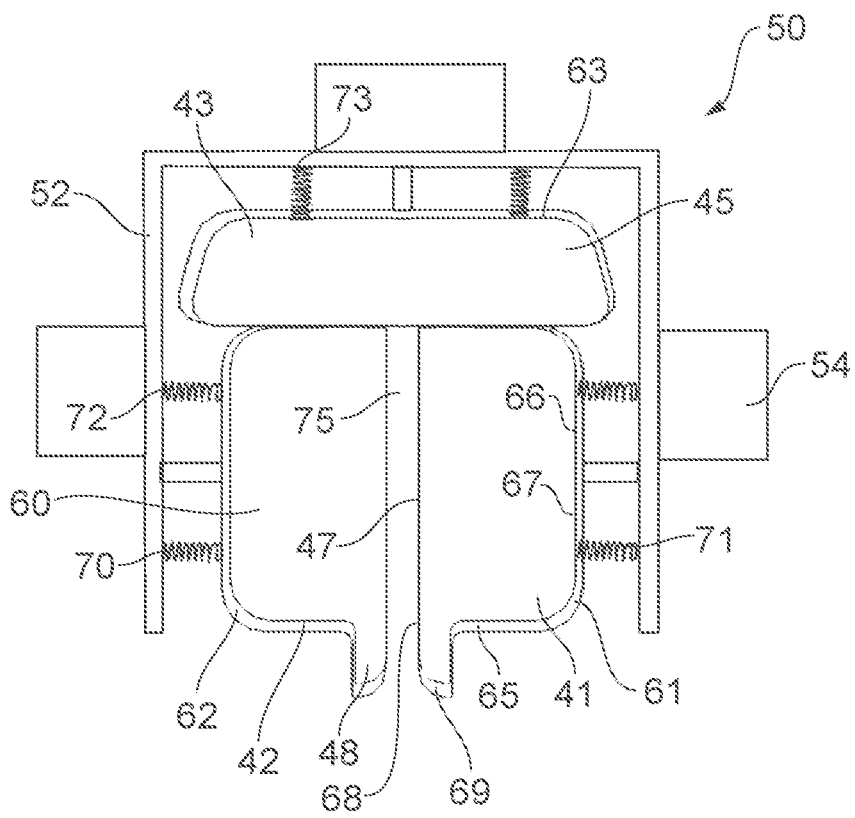
FIG. 4 is a schematic cut-away front view of the tool shown in FIG. 3 showing seal plates of the seal plate arrangement held by a holder of the tool.

A tool or tooling system 50 for locating the seal plates 41, 42, 43 is shown in FIGS. 3 and 4, with FIG. 3 showing the tool 50 from a rear, urging, side 51, and FIG. 4 showing the tool 50 from a front, rib locating, side 52. The tool 50 has a body 53. The body 53 may have a rear wall which is omitted in FIG. 4 for clarity. The body 53 forms a tool housing.

The body 53 has a mount 54. The mount 54 is configured to removably mount the tool 50 to the rib 20. The mount 54 comprises mounting sections 55 for releasably mounting the tool 50 relative to the rib 20. The plurality of mounting sections 55 hold the tool 50 stabily on the rib 20. The mount 54 holds the tool 50 on the face 23 of the rib 20, with the tool 50 positioned over the cut-out or recess 30. As such, the tool 50 may be correctly located. The mount 54 in one embodiment comprises a rib stiffening assembly tool (not shown). The rib stiffening assembly tool comprises a removable stiffening member. The rib stiffening assembly tool is mounted to the rib to stiffen the rib during assembly of the wing box 18.

The tool 50 has a holder 60. The holder 60 is configured to hold the seal plates 41, 42, 43. When the tool 50 is mounted over the cut-out 30, the holder 60 is configured to hold each of the seal plates 41, 42, 43 at least partially over the cut-out 30. The tool has a biasing arrangement 70. The biasing arrangement 70 acts on the holder 60 to bias the holder 60. The biasing arrangement 70 urges each of the seal plates 41, 42, 43 towards each other. As described below, the biasing arrangement 70 biases the seal plates 41, 42, 43 into an aligned position with the stringer 24 received in the cut-out 30.

The tool 50 has a fixing arrangement 80. The fixing arrangement 80 selectively acts on the holder 60 to hold the holder 60, and therefore fix the seal plates 41, 42, 43 in a position.

The holder 60 comprises a first holder part 61, a second holder part 62 and a third holder part 63. Each holder part 61, 62, 63 is configured to hold one of the seal plates 41, 42, 43. The holder parts 61, 62, 63 are movable elements in the housing 51.

The first holder part 61 is configured to hold the first seal plate 41. The second holder part 62 is configured to hold the second seal plate 42. The third holder part 63 is configured to hold the third seal plate 43.

Each holder part 61, 62, 63 comprises a plate member 65. The holder parts 61, 62, 63 will be described predominantly with reference to the first holder part 61, but the description applies to each holder part. The plate member 65 comprises a seal plate retaining surface 66. The seal plate retaining surface 66 is formed by a cavity 67 in the plate member 65. The cavity 67 corresponds to the shape of the respective seal plate 41, 42, 43 and acts to align the seal plate 41, 42, 43 in the tool 50. Alignment of seal plates 41, 42, 43 in the tool 50 may be achieved by alternative means, for example by upstanding tabs.

Each holder part 61, 62, 63 has a retention element (not shown), acting as a retaining means, for retaining the respective seal plate 41, 42, 43. The cavity 67 may be configured to push fit receive the respective seal plate 41, 42, 43. A releasable adhesive or suction pad (not shown) may form the retention element. When the seal plate 41, 42, 43 is received by the respective holder part 61, 62, 63, the rib locating face 45 is presented at the front side 52 of the tool 50. The rib locating face 45 is exposed, as shown in FIG. 4.

Each holder part 61, 62, 63 comprises an aligning edge 68. The aligning edge 68 is configured to align with the stringer web 27. The aligning edge 68 is linear to align with the side surface 35 or free end 27a of the stringer web 27, however the shape may differ. In the present embodiment, each holder part 61, 62, 63 is configured so that the aligning edge 68 aligns with the abutment edge 47 of the received seal plate. However, in embodiments, the holder part 61, 62, 63 is configured so that the abutment edge 47 of the received seal plate 41, 42, 43 protrudes from the aligning edge 68 of the holder part 61, 62, 63. As such, abutment of the seal plate 41, 42, 43 with the stringer web 27 is ensured. Alternatively, in embodiments, the holder part 61, 62, 63 is configured such that the abutment edge 47 of the received seal plate 41, 42, 43 is slightly from the aligning edge 68 of the holder part 61, 62, 63. As such, it is possible to ensure that a consistent bead of sealant is receivable between the seal plate 41, 42, 43 and the stringer 24 upon assembly.

Each of the first and second holder parts 61, 62 has a locating tab 69. The locating tab 69 is configured to extend from a lower end of the respective holder part 61, 62. The locating tabs 69 receive the end protrusions 48 of the first and second seal plates 41, 42. The locating tabs 69 define part of the respective aligning edge 68. The locating tabs 69 act as guides with cam surfaces upon which the free end 27a of the stringer web 27 acts.

The biasing arrangement 70 comprises resilient members 74. The resilient members 74 are configured to act on the holder 40. That is, the resilient members 74 are configured to act on the first, second and third holder parts 61, 62, 63. The biasing arrangement 70 comprises a first biasing mechanism 71 configured to act on the first holder part 61, a second biasing mechanism 72 configured to act on the second holder part 62 and a third biasing mechanism 73 configured to act on the third holder part 63. The resilient members 74 in the present embodiment are compression springs, however alternative biasing arrangements are envisaged. In the embodiment described herein, each biasing mechanism comprises two resilient members, however the number of resilient members may vary. The biasing mechanism of each respective holder part allows pivoting of the holder part about its plane.

The biasing arrangement 70 is configured to hold the first and second holder parts 61, 62 in a spaced arrangement in a neutral position, that is when the stringer 24 is not received therebetween. A spacing 75 is therefore provided between the first and second holder parts 61, 62. The width of the spacing 75 in the neutral position is less than the thickness of the stringer web 27 to be received in the spacing. The biasing arrangement 70 is configured to act inwardly in the tool 50. When the stringer web 24 is received by the tool 50, the biasing arrangement 70 is configured to urge the holder parts 61, 62, 63 against the stringer web 24.

The fixing arrangement 80 comprises actuators 81, 82, 83 which are selectively actuatable to fix the position of the holder 60. The fixing arrangement 80 is shown in FIG. 3. The actuators 81, 82, 83 are each configured to act on a respective one of the first, second and third holder parts 61, 62, 63. Each actuator 81 is configured to fix the position of the respective holder part in the tool relative to each other holder part 61, 62, 63. Each actuator 81, 82, 83 is operable to act on a rear side of the respective holder part 61, 62, 63. The actuators 81, 82, 83 are configured to urge the holder parts 61, 62, 63 towards, and therefore against, the rib 20. Each actuator 81, 82, 83 is electrically actuated.

The actuator is configured to selectively move between retracted and urging conditions.

Figure 16:
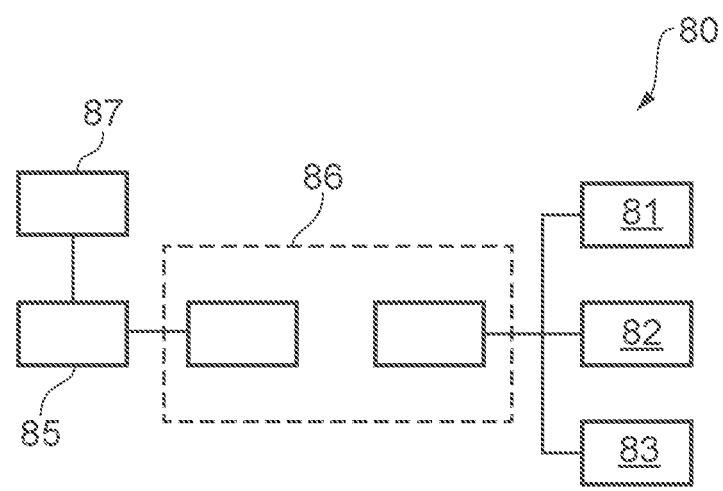
FIG. 16 is a schematic view of part of the fixing arrangement shown in FIG. 8.

Referring to FIG. 16, the fixing arrangement 80 comprises a controller 85 and a communication module 86. The controller 85 is user-operable with a user input module 87. The controller 86 comprises a processor and a memory unit. The fixing arrangement 80 is configured to be operable remotely from the tool 50. The actuators 81, 82, 83 are configured to be wirelessly operable. The communication module 86 is a wireless communication device. As such, the tool 50 is operable remotely when the lower cover 21b is received on the ribs 20, and so access to the fuel tank 22 is not required to operate the tool.

The tool 50 further comprises a templating arrangement 90. The templating arrangement 90 forms part of a position marking arrangement to provide for marking the position of the seal plates 41, 42, 43 on the rib 20, when the tool 50 is holding the seal plates 41, 42, 43 in the aligned position, as will become clear below.

The templating arrangement 90 comprises a plurality of template holes 91 in the holder 60. Each holder part 61, 62, 63 has two template holes 91 formed through the plate body 65. The template holes 91 correspond to a predetermined location of forming fastening holes 92 (refer to FIG. 10) in each seal plate 41, 42, 43. During assembly, the template holes 91 are usable to form corresponding fastening holes 92 and attachment holes 93 (see FIG. 11) in the seal plates 41, 42, 43 and rib web 27 for receiving fasteners 44.

A method of assembling the aircraft assembly will now be described with reference to FIGS. 5 to 14. The method of assembling the aircraft assembly also includes a method of fixing a seal member arrangement over a stringer-receiving recess in a rib of an aircraft.

Figure 5:
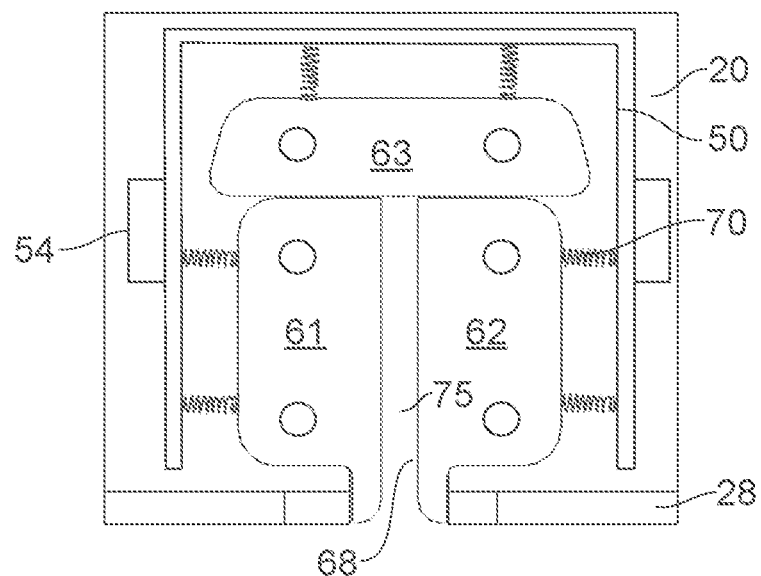
FIG. 5 is a schematic view of a rib with the tool shown in FIGS. 3 and 4 mounted on the rib and disposed over a stringer-receiving recess, with the holder in a neutral position.

As shown in FIG. 5, the seal plates 41, 42, 43 are loaded in the tool 50. Each holder part 61, 62, 63 receives and holds the respective seal plate 41, 42, 43. The tool 50 holding the seal member arrangement 40 is positioned over the cut-out or recess 30 in the rib 20. The tool 50 is removably mounted to the rib 20 using the mount 54. As such, the seal plates 41, 42, 43 are disposed to extend over the recess 30. The first seal plate 41 overlaps the first side edge 31, the second seal plate 42 overlaps the second, opposing, side edge 32, and the third seal plate 43 overlaps the upper edge 33.

The holder 60 is disposed in its neutral position, with the biasing arrangement 70 holding the first and second holder parts 61, 62 in spaced relationship. The spacing 75 extends over the recess 30. The third holder part 63 abuts, but does not overlap, the first and second holder parts 61, 62.

Figure 6:
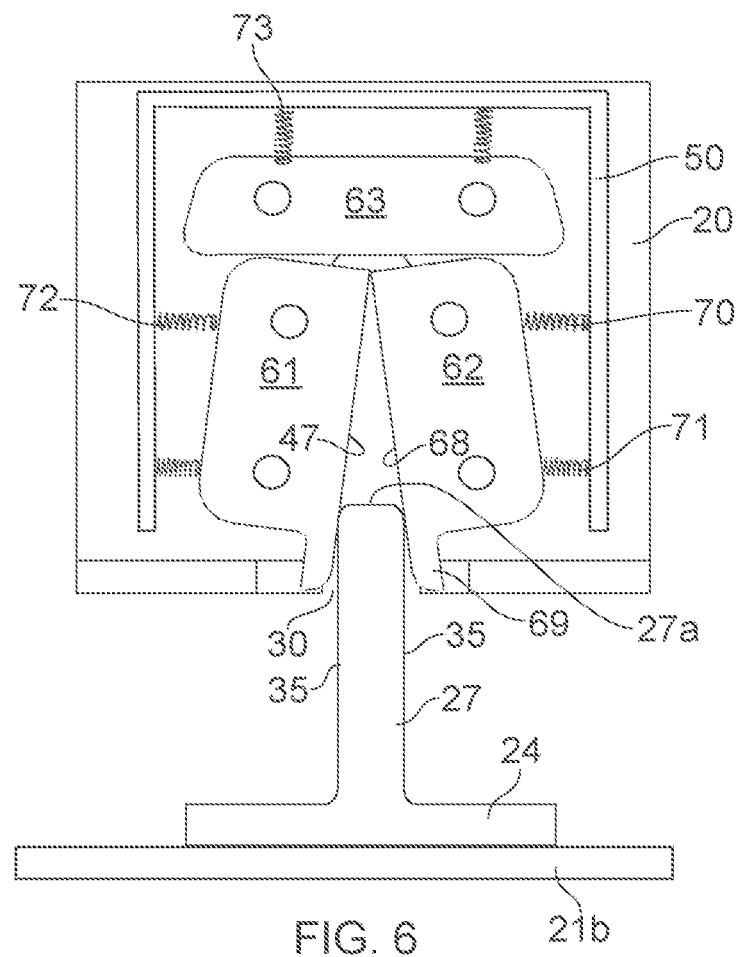
FIG. 6 is a schematic view of the rib and tool shown in FIG. 5 with a stringer partially received in the recess with the holders with the seal plates adapting to receive of the stringer.

As shown in FIG. 6, the lower cover 21 with stringers 24 attached are brought towards the ribs 20. The stringers 24 are aligned with the corresponding recesses 30 in the rib 20. The free end 27a of the stringer web 27 is received in the recess 30. As the stringer web 27 is moved into the recess 30, the free end 27a of the stringer web 27 contacts the tool 50. The free end 27a abuts the first and second holder parts 61, 62. Depending on the alignment of the stringer 24 with the recess 30, the free end 27a may contact one holder part before the other. The first and second holder parts 61, 62 are urged to distend outwardly. The biasing arrangement 70 biases the first and second holder parts 61, 62, and the held seal plates 41, 42 towards and against the side surfaces 35 of the stringer web 27. The locating tabs 69 act as guides to guide positioning of the stringer 27 and holder parts 61, 62. The locating tabs 69 also act as cam surfaces to cause the lower ends of the first and second holder parts 61, 62 to pivot outwardly. As such, the free end 27a of the stringer web 27 is received by the holder 60 as the rib 20 and lower cover 21b are brought together.

Figure 7:
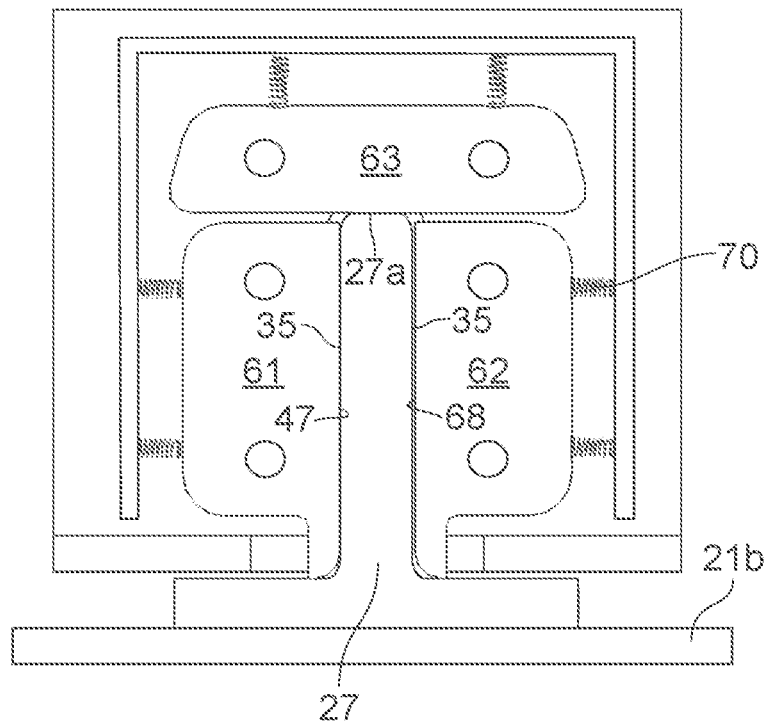
FIG. 7 is a schematic view of the rib and tool shown in FIG. 6 with the stringer in an assembled position in the recess with the holder in an adapted position with the stringer.

As shown in FIG. 7, the rib 20 and lower cover 21b are moved into an assembled position. In this assembled position, the first and second holder parts 61, 62, and therefore the first and second seal plates 41, 42, are biased into the aligned position with the stringer web 27. The third holder part 63 is brought into contact with the free end 27a of the stringer web 27 in the assembled position, and is biased thereagainst. As such, the aligning edges 68 align the holder parts 61, 62, 63 with the stringer web 27 such that the abutment edge 47 of each of the first seal plates 41, 42, 43 is aligned with, and abuts, the stringer web 27 in the aligned position. In such a position, the gap 36 between the rib 20 and stringer is covered by the seal plates 41, 42, 43.

Figure 8:
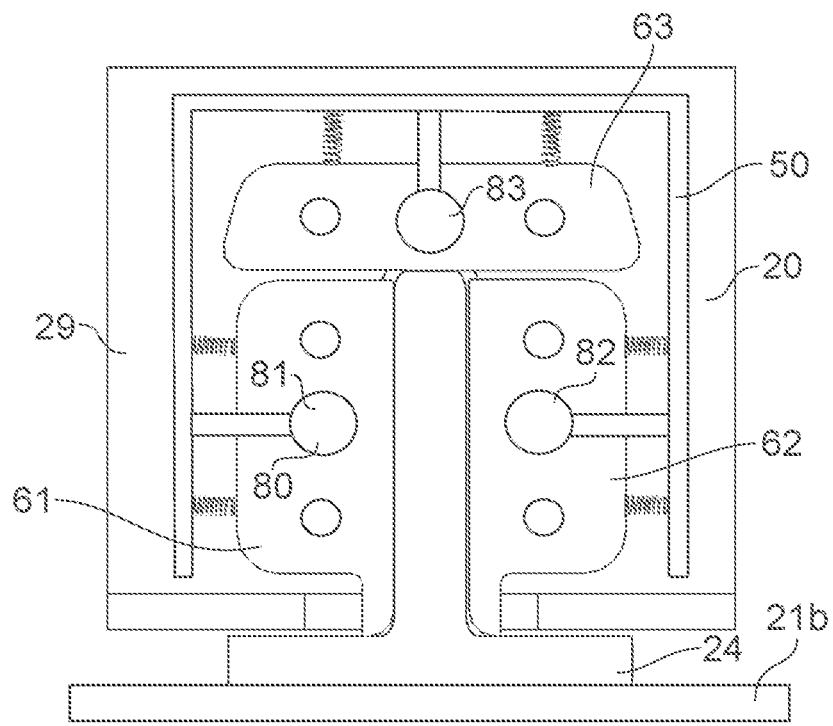
FIG. 8 is a schematic view of the rib and tool shown in FIG. 7 with the stringer in the assembled position in the recess with the holder in the adapted position to receive the stringer, and a fixing arrangement fixing the holder in the adapted condition.

As shown in FIG. 8, the fixing arrangement 80 is operated. The actuators 81, 82, 83 are wirelessly actuated to fix the seal plates 41, 42, 43 in the aligned position. The actuators 81, 82, 83 act on the holder 60 to urge the holder parts 61, 62, 63 against the rib web 29. The seal plates 41, 42, 43 are therefore clamped between the tool 50 and the rib 20.

With the above configuration it is possible to locate and fix the seal plates in position without having access to the fuel tank 22.

Figure 9:
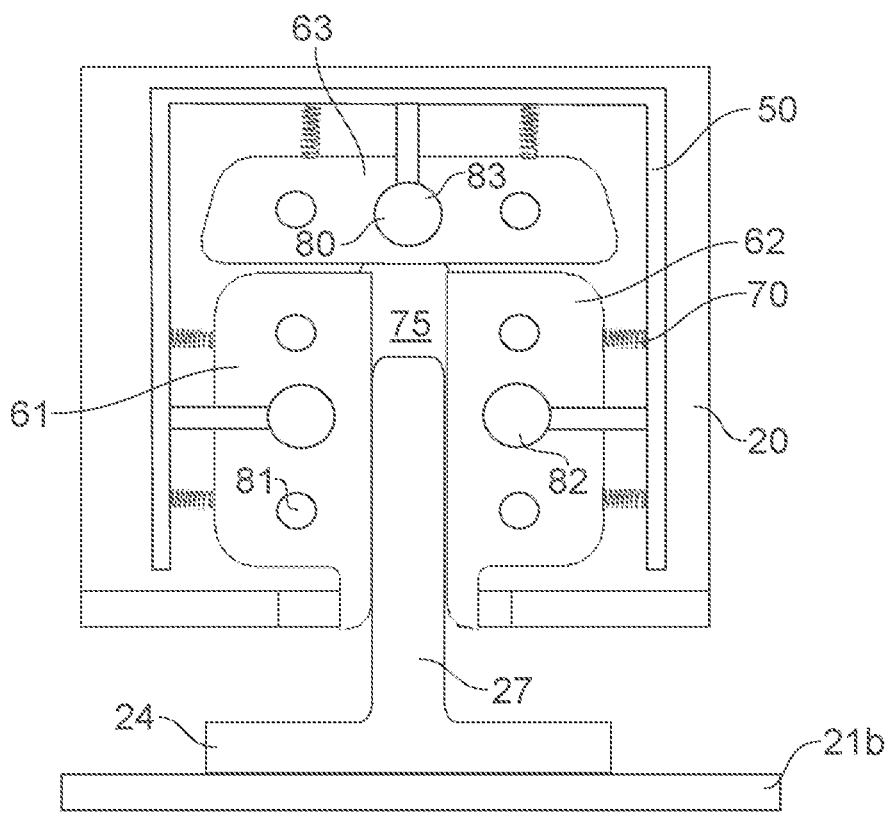
FIG. 9 is a schematic view of the rib and tool shown in FIG. 8 with the holder fixed in the adapted position and the stringer in a partially removed position.

As shown in FIG. 9, the lower cover 21b is removed from the rib 20. The actuators 81, 82, 83 retain the holder 60 in the aligned position corresponding to the shape of the stringer web 27. The actuators 81, 82, 83 act against the biasing arrangement 70 to prevent the biasing arrangement 70 moving the holder 60. The stringer web 27 is withdrawn from the spacing 75 between the holder parts 61, 62, 63.

Figure 10:
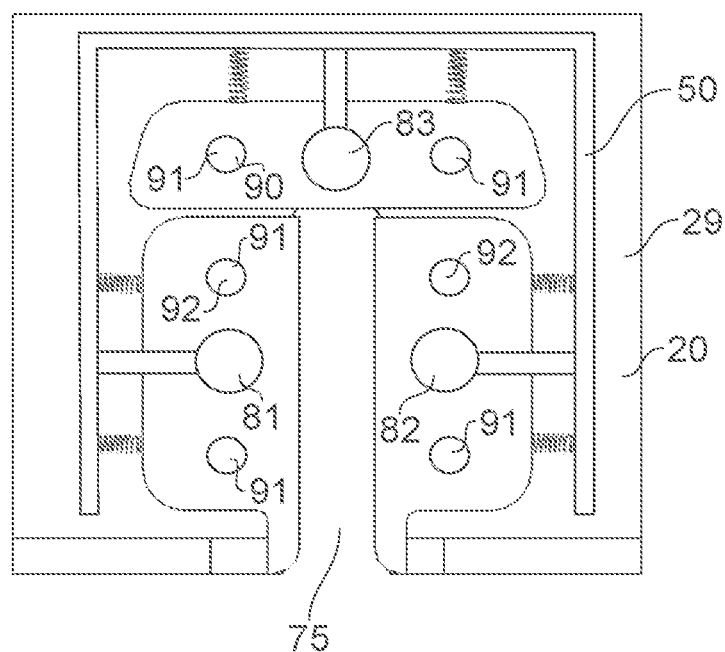
FIG. 10 is a schematic view of the rib and tool shown in FIG. 9 with the holder fixed in the adapted position and the stringer removed, and showing a templating arrangement for forming corresponding fastening holes in the seal plates and rib.

In FIG. 10, the rib 20 and tool 50 are shown with the lower cover 21b and stringer 24 removed. With the lower cover removed, the tool 50 is accessible. The holder 60 and therefore seal plates 41, 42, 43 are retained in the aligned position, with the spacing 75 corresponding accurately to the shape and dimensions of the stringer web 27. The template holes 91 of the templating arrangement 90 are disposed accurately for forming the corresponding fastening holes 92 and attachment holes 93 in both the seal plates 41, 42, 43 and the rib web 29. As such, the fastening holes 92 and attachment holes 93 may be easily and accurately formed. The templating arrangement 90 provides for marking the location of the seal member arrangement on the rib 20 in the aligned position. As such, templating guide holes may be formed to mark the necessary location.

Figure 11:
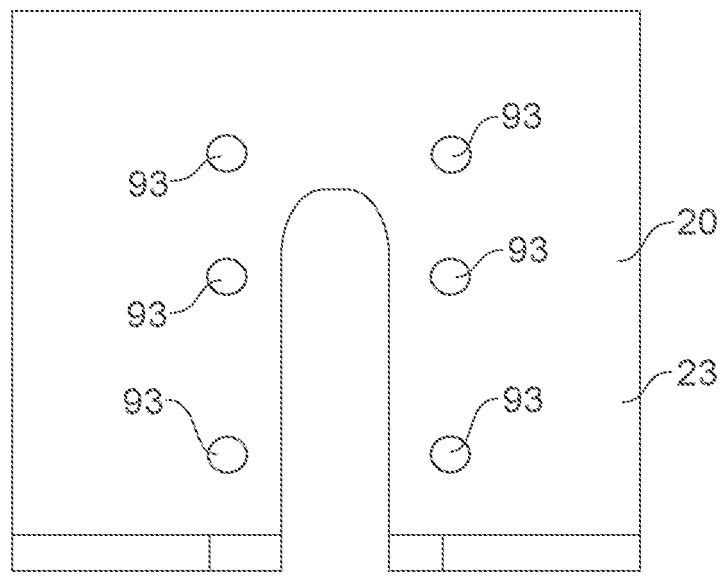
FIG. 11 is a schematic view of the rib shown in FIG. 10 with the tool removed and fastening holes formed in the rib.

The tool 50 may then be removed. In FIG. 11, the rib 20 is shown with the attachment holes 93 formed in the face 23 in accurate positions for aligning the seal plates 41, 42, 43 over the edges 31, 32, 33 of the recess 30 to cover the gap 36.

Figure 12:
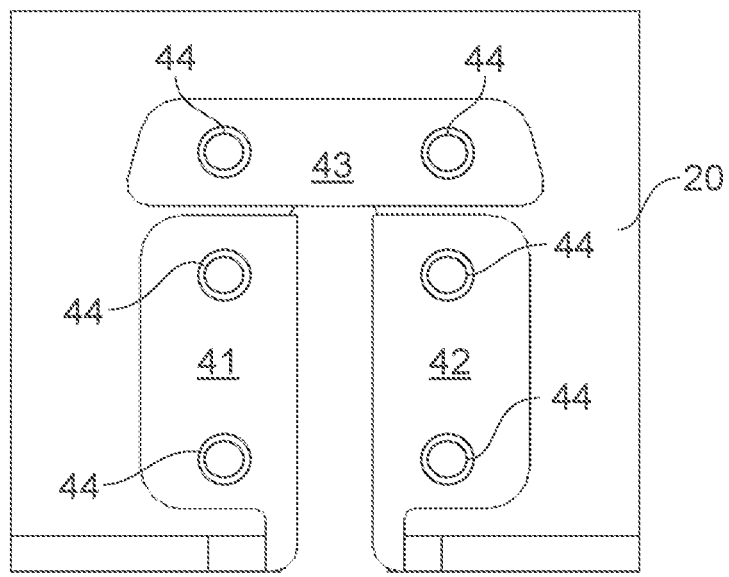
FIG. 12 is a schematic view of the rib shown in FIG. 11 with the seal plates fixed to the rib in a fastening position corresponding to the adapted condition.

The seal plates 41, 42, 43 with the formed fastening holes are removed from the tool 50. In FIG. 12, the seal plates 41, 42, 43 are fastened to the rib 20 with the fasteners 44. The seal plates are able to be correctly and accurately aligned and mounted to the rib 20 without the cover 21 being in the assembled position. As such, ease of access is maximised. Upon affixing the seal plates 41, 42, 43, curable sealant (not shown) is applied to the peripheral edges of each of the seal plates 41, 42, 43. A channel (not shown) may extend along the abutment edge 47 or the side surfaces 35 of the stringer web 27 to receive sealant. The fasteners 44 may be easily tightened to the correct torque with ease of access.

Figure 13:
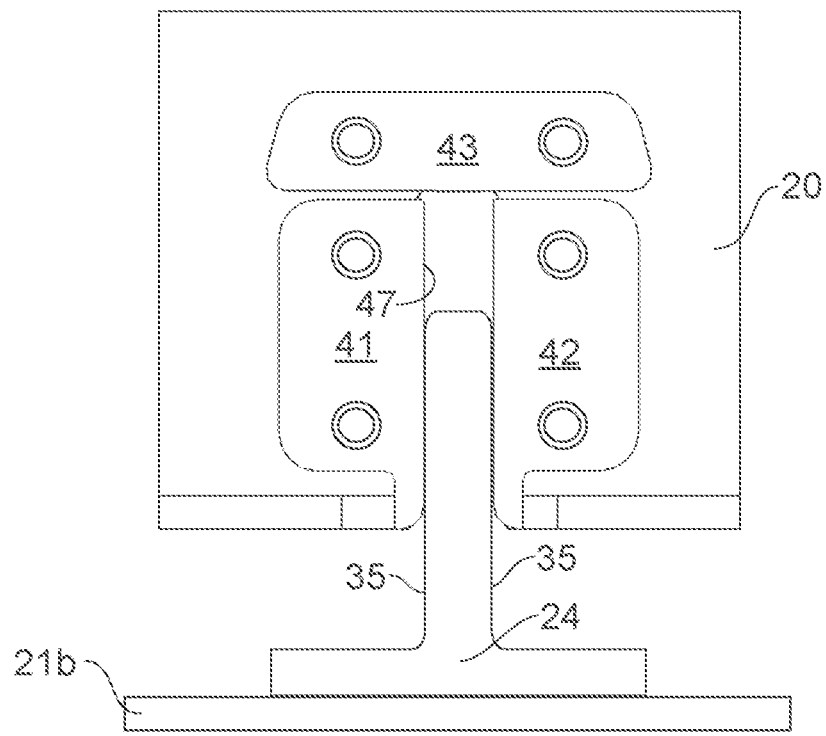
FIG. 13 is a schematic view of the assembled rib and seal plates shown in FIG. 12 with the stringer partially received in the recess.

Once assembled, the seal plates 41, 42, 43 are in their aligned position. As shown in FIG. 13, the lower cover 21b may be brought back towards the assembled position with the rib 20. As the correct positioning of each of the seal plates 41, 42, 43 relative to the stiffener 24 has already been determined, the seal plates 41, 42, 43 correctly locate against the stiffener web 27 to cover the gap 36. The sealant (not shown) applied to the seal plates 41, 42, 43 and/or stiffener web 27 prior to reassembling the lower cover 21b and rib 20 will fill any residual gaps between the seal plates 41, 42, 43 and other components.

The lower cover 21b and rib 20 is shown fully assembled in FIG. 14. The lower cover 21b is fastened to the rib 20. The gap 36 between the stiffener 27 and rib 20 is fluidly sealed (although the sealant is omitted for clarity).

Figure 15:
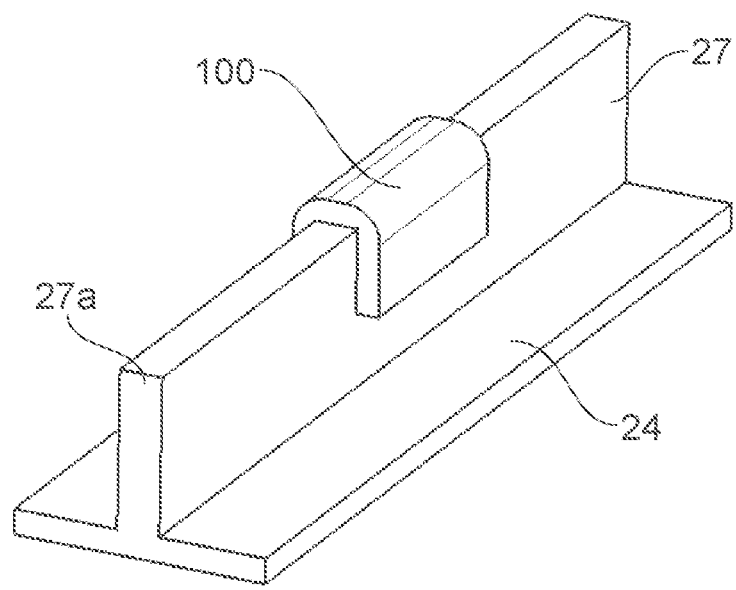
FIG. 15 is a schematic perspective view of a stringer with a stringer cover.

FIG. 15 shows an embodiment in which a cover panel 100 is applied to the stringer web 27 of the stringer 24 in the region of the stringer 24 to be received in the cut-out 30. The cover panel 100 is a strip of material extending over the free end 27a of the stringer web 27. The thickness of the cover panel 100 is exaggerated in FIG. 15 to emphasise the arrangement. The cover panel 100 is U-shaped. The cover panel 100 may be formed from a deformable material. With the cover panel 100 it is possible to aid protection of the stringer web 27 as it is inserted into the cut-out 30. The cover panel 100 is usable with the tool 50 described above, or may be used without the tool 50.

Although reference to the aircraft assembly, ribs, covers and stringers are described herein with reference to the wing box 18, it will be understood that in embodiments such an aircraft assembly relates to another aircraft assembly, for example part of the fuselage, another wing assembly or horizontal/vertical stabilisers. The method and tool described herein may also be applied to such an aircraft assembly.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A tool for locating a seal member arrangement over a stringer-receiving recess in a rib of an aircraft assembly, the tool comprising:
    a holder configured to hold the seal member arrangement over the recess,
    a biasing arrangement configured to act on the holder to bias the seal member arrangement into an aligned position with a stringer received in the recess, and
    a fixing arrangement configured to act on the seal member arrangement to fix the seal member arrangement in the aligned position.

2. The tool of claim 1, comprising a mount configured to mount the seal member arrangement to the rib.

3. The tool of claim 1, wherein the holder is configured to align an abutment edge of the seal member arrangement with an adjacent surface of the stringer received in the recess in the aligned position.

4. The tool of claim 1, wherein the seal member arrangement comprises a seal plate, and the holder is configured to receive the seal plate.

5. The tool of claim 4, wherein the seal plate is a first seal plate, and the holder comprises a first holder part configured to hold the first seal plate, and the tool comprises a second holder part configured to hold a second seal plate, wherein the biasing arrangement is configured to bias the first holder part and the second holder part in different directions.

6. The tool of claim 5, wherein the biasing arrangement is configured to bias the first holder part and the second holder part in opposing directions.

7. The tool of claim 5, wherein the first and second holder parts are movable between a neutral position in which a spacing between the first and second seal plates held by the first and second holder parts is less than a thickness of a web of the stringer configured to be received between the holders, and the aligned position in which the spacing between the first and second seal plates held by the first and second holder parts corresponds to the thickness of the web of the stringer.

8. The tool of claim 5, further comprising a third holder part configured to hold a third seal plate wherein the biasing arrangement is configured to bias the third holder part in different directions to the first holder part and the second holder part.

9. The tool of claim 1, wherein the biasing arrangement is configured to allow the seal member to pivot.

10. The tool of claim 1, further comprising a position marking arrangement for marking the alignment of the seal member arrangement relative to the rib.

11. The tool of claim 1, wherein the fixing arrangement is configured to urge the seal member arrangement against the rib when the seal member arrangement is located over the recess.

12. The tool of claim 1, wherein the fixing arrangement is configured to be wirelessly operable.

13. A sealing kit for sealing a stringer-receiving recess in a rib of an aircraft assembly, comprising the tool of claim 1 and at least one seal member.

14. A method of fixing a seal member arrangement over a stringer-receiving recess in a rib of an aircraft, the method comprising:
    positioning a tool holding a seal member arrangement at least partially over the recess,
    biasing the seal member arrangement into an aligned position with a stringer received in the recess,
    removing the stringer in order to have access to the tool and inspect that the seal member arrangement is correctly and accurately aligned; and
    fastening the seal member arrangement to the rib in the aligned position, wherein the step of fixing the seal member arrangement in the aligned position is done by a fixing arrangement of the tool.

15. A method of fixing a seal member arrangement over a stringer-receiving recess in a rib of an aircraft, the method comprising:
    providing a tool for locating a seal member arrangement over a stringer- receiving recess in a rib of an aircraft assembly, the tool including a holder configured to hold the seal member arrangement over the recess, a biasing arrangement configured to act on the holder to bias the seal member arrangement into an aligned position with a stringer received in the recess, and a fixing arrangement configured to act on the seal member arrangement to fix the seal member arrangement in the aligned position,
    positioning the tool holding a seal member arrangement at least partially over the recess,
    biasing the seal member arrangement into an aligned position with a stringer received in the recess,
    fixing the seal member arrangement in the aligned position,
    removing the stringer from the recess, and
    fastening the seal member arrangement to the rib in the aligned position.

16. The method of claim 14, comprising marking the location of the seal member arrangement on the rib in the aligned position, and
    removing the tool prior to fastening the seal member arrangement in the aligned position.

17. The method of claim 14, comprising, subsequent to fastening the seal member arrangement to the rib, reinserting the stringer in the recess.

18. The method of claim 17, comprising applying sealant to the seal member arrangement prior to reinserting the stringer in the recess.

19. An aircraft assembly formed by the method of claim 14.

* * * * *